(12) United States Patent
Rose et al.

(10) Patent No.: US 6,267,705 B1
(45) Date of Patent: Jul. 31, 2001

(54) RETARDER BRAKING MOMENT ADAPTATION DURING CLUTCHING AND GEAR CHANGING

(75) Inventors: Peter Rose, Heidenheim; Peter Heilinger, Crailsheim; Gunter Schoof, Satteldorf; Roland Scherer, Crailsheim, all of (DE)

(73) Assignee: Voith Turbo GmbH & Co., K.G., Heidenheim (DE)

( * ) Notice: Subject to any disclaimer, the term of this patent is extended or adjusted under 35 U.S.C. 154(b) by 0 days.

(21) Appl. No.: 09/284,528

(22) PCT Filed: Oct. 15, 1997

(86) PCT No.: PCT/EP97/05673

§ 371 Date: Jun. 29, 1999

§ 102(e) Date: Jun. 29, 1999

(87) PCT Pub. No.: WO98/17517

PCT Pub. Date: Apr. 30, 1998

(30) Foreign Application Priority Data

Oct. 18, 1996 (DE) .............................. 196 43 086

(51) Int. Cl.[7] .......................... B60K 41/20; B60K 41/26
(52) U.S. Cl. ........................ 477/92; 477/96; 192/12 A
(58) Field of Search .................. 477/92, 96; 192/12 A, 192/13 A (56) References Cited

U.S. PATENT DOCUMENTS

| | | | |
|---|---|---|---|
| 3,941,224 | * 3/1976 | Hanke | 192/12 A |
| 4,257,504 | * 3/1981 | Hanke | 192/12 A |
| 4,993,283 | * 2/1991 | Kikuchi et al. | 477/96 |
| 5,282,399 | 2/1994 | Sano et al. | . |
| 5,351,795 | * 10/1994 | Dadel et al. | 477/96 |
| 5,357,444 | * 10/1994 | Ishiguro et al. | 477/92 |
| 5,362,285 | * 11/1994 | Sano et al. | 477/92 |

FOREIGN PATENT DOCUMENTS

| | | |
|---|---|---|
| 43 41 213 A1 | 12/1993 | (DE) . |
| 44 08 349 A1 | 3/1994 | (DE) . |
| 0 784 011 A2 | 12/1996 | (EP) . |

OTHER PUBLICATIONS

Article Die neue Dekompressionsventil–Motorbremse (DVB) von Mercedes–Benz MTZ Motortechnische Zeitschritt 56 (1995) 7, 8.

Article KFZ–Anzeiger Jahrgang Einzelpreis 5, 75 DM (1994).

* cited by examiner

*Primary Examiner*—Sherry Estremsky
(74) *Attorney, Agent, or Firm*—Taylor & Aust, P.C.

(57) ABSTRACT

A regulating device is for a primary braking system in the drive train of a vehicle, especially a primary retarder in a vehicle. The device includes at least one control/regulator unit, a device for detecting gear shifts transmitting at least one measuring signal, and at least one actuator enabling the braking moment of the primary braking system to be adjusted. The regulating device is characterized in that the at least one control/regulator unit controls the at least one actuator in order to adjust the braking moment of the primary braking system according to the measuring signal or measuring signals in such a way that the braking moment of the primary brake is reduced for the entire duration of a gear shift.

8 Claims, 5 Drawing Sheets

| Nr | Labeling | I/O | H/L | Description |
|---|---|---|---|---|
| PIN 3 | nMotor | AI | | Engine Speed |
| PIN 4 | Clutch | DI | | Clutch Signal On/Off |
| PIN 6 | M Mot = 0 | DI | | Signal Engine Torque = 0 or >0 |
| PIN 8 | Idle | DI | | Neutral Signal On/Off |

Fig. 4

| Function / In / Output | Braking Operation | | | | |
|---|---|---|---|---|---|
| | M-Adaptation Due to: | | | | |
| | Clutching + Changing Gears | Accelerate (Increase Fuel) | | Low Engine Speed | |
| | M2 | M3 | | M4 | |
| Input Clutch | On | | | On | Off |
| Gas Pedal ($M_{Mot} > 0$) | | On | | | |
| $n_{Motor}$ | | | | $< n_{min}$ | |
| Output Proportional Control Valve | Off | Off | | Off | |
| By-Pass Valve | On | On if G2 | Off if G3 | On | Off |
| Comments (Calculated from $V_{ist}$, $n_{motor}$, and EOL Parameters) | $M = M_{min}$ | $M = M_{min}$ | $M = 0$ | $M = M_{min}$ | $M = 0$ |

RETARDER BRAKING MOMENT ADAPTATION DURING CLUTCHING AND GEAR CHANGING

BACKGROUND OF THE INVENTION

1. Field of the Invention

The present invention relates to a control device for a primary braking system, more particularly, to a primary retarder in a vehicle, as well as to a method to control a primary braking system.

2. Description of the Related Art

Primary braking systems generally refer to braking systems which are positioned in front of the clutch and the transmission. (Ref. Kfz-Anzeiger. 44th year, 1991, report: "Safely Downhill", page 30 and Lastauto Omnibus April, 1991, report "Against the Current", page 30). Secondary braking systems, on the other hand, are mounted directly on the transmission or in the drivetrain downstream of the transmission, and act on the rear axles of the vehicle.

Next to primary retarders, there are the following additional primary braking systems that have become well known in the industry: Guillotine-type exhaust brake; bleeder brake; compression release brake The guillotine-type exhaust brake relies on the increased backpressure to generate the braking torque. During braking, the exhaust piping is nearly fully blocked in order to impede the outflow of the cylinder charge during the exhaust stroke, thus elevating the braking power of the engine.

The bleeder brake (Ref. Kfz-Anzeiger. 44th year, 1991, report: "Safely Downhill", pages 10–13) is a type of brake which utilizes an additional valve, a so-called decompression valve which is integrated into the cylinder head. When activated during the third stroke of the cycle, it substantially lowers the expansion pressure acting on the piston and, thus, lowers the acceleration of the piston. As a result, a difference develops between the compression and expansion work, which can be used to increase the braking power of the engine. In particular, such a braking system can be modulated by controlling the throttle positions.

In a further development of the bleeder brake, the decompression valve is not kept open during the entire working cycle, but only during a short time span (ref. MTZ Motortechnische Zeitschrift 56 (1995) 7/8 pages 418–423; "The New Decompression Release Brake (DVB) from Mercedes Benz").

The control of such an engine brake can be performed by a proportional control valve, serving the function of a pressure control valve with the capability of affecting the opening characteristics of the decompression valve.

For further details, the above indicated article of the MTZ Motortechnische Zeitschrift 56 (1995) 7/8 page 422 is recommended as reference.

The compression release brake is, just like the bleeder brake, an engine brake. In the case of the compression release brake, a valve control device releases the compression, which leads to—as with the bleeder brake—a substantial increase in engine brake power (ref. Kfz-Anzeiger, 47th year, 1/1994, report: "Elegantly Packaged—Test Report Volvo FH", pages 10–12).

While the control device and the control method, in accordance to the present invention can be, as indicated above, applied to any primary brake systems, primary retarders also provide a unique application for this invention. It is, unlike the secondary retarder which is normally mounted between the transmissions and the propeller shaft, acting directly on the engine, as already described above. A primary retarder, which is permanently connected to the engine, is known from German Patent document DE 44 08 349, incorporated herein by reference. Due to the direct connection of the primary retarder to the engine, it is particularly important on a configuration such as this one to assure that the retarder is deactivated upon separation of the driveline from the transmission, or upon activating the clutch or shifting the vehicle into neutral, in order to keep the retarder from slowing down the engine. If this is not assured, a rapid load change, as a result of a clutching or de-clutching event, can lead to unacceptable low engine speeds because of the braking action of the retarder.

This problem becomes especially acute whenever the retarder is activated during braking operation, especially during the basic retarder functions "braking mode" or "V-constant". The basic function "braking mode" is characterized by a fixed brake setting of the retarder. This can be achieved by use of a hand brake lever of a foot pedal, which, based on a fixed correlation, achieves a certain braking torque, which can range from a minimum braking torque $M_{min}$ to a maximum braking torque $M_{max}$.

While operating the brake at "V-constant", the retarder can be, from a controls standpoint, coupled with the cruise control. The retarder braking action is achieved by controlling the braking torque so that a constant speed can be achieved, i.e., during downhill operation.

Control devices or methods for the control of a retarder with respect to its braking torque have been published in U.S. Pat. No. 5,507,361, which is incorporated herein by reference.

In order to avoid a conflicting operation between the retarder and the engine, i.e., at elevated speeds, German Patent Document DE 43 41 213 proposes to establish a relative priority of the individual systems for specific applications. For example, it is proposed to always yield the priority to the retarder in case the throttle and retarder are activated simultaneously. If the "constant velocity" function of the retarder is activated, the application suggests moving the throttle lever of the engine to the idle position.

A conflicting operation between the retarder and the engine is, according to the controls logic described in German Patent Document DE 43 41 213, acceptable for short periods of time during shift events.

SUMMARY OF THE INVENTION

The present invention offers an improved control device—relative to the state-of-the-art devices—for a primary system, more particularly, a retarder, with the capability of avoiding conflicting operation between the engine and the retarder during shift events. Another feasible primary braking system is a decompression engine brake.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
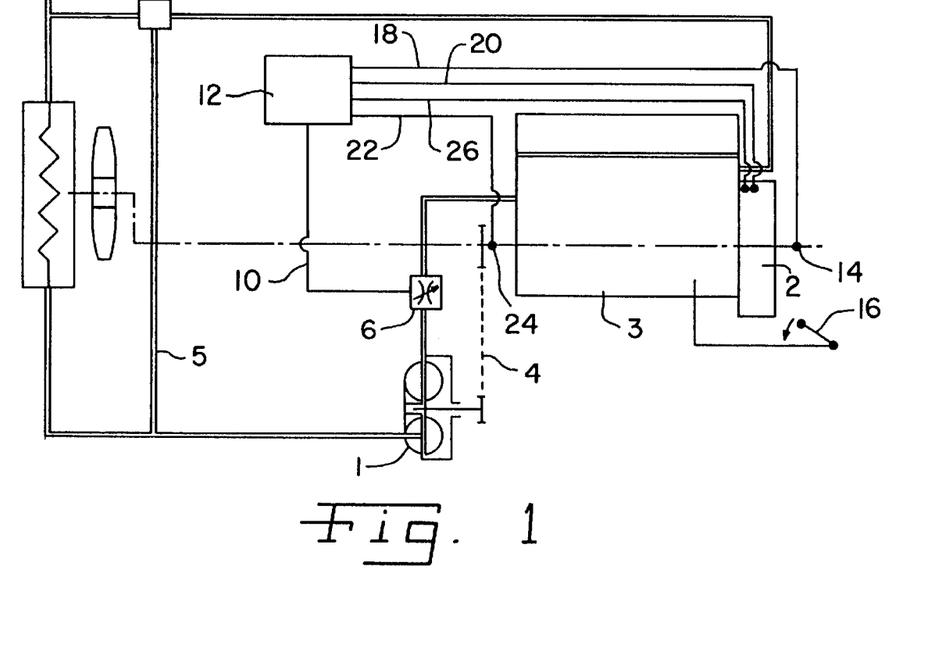
FIG. 1 is a schematic diagram of one embodiment of a primary retarder with a control device in accordance to this invention.

Referring now to the drawings and particularly to FIG. 1, there is shown a representative drawing of a primary retarder, including the control/regulator unit as described in German Patent Document DE 44 08 349, whose contents are incorporated by reference herein. Retarder 1 is positioned in front of transmission 2 of engine 3. Retarder 1 is permanently linked to engine 3, more concisely, the crankshaft of the engine. In this particular case, the retarder is permanently linked to the engine 3 via gear reduction unit 4. Retarder 1 and engine 3 utilize the same cooling circuit 5. The coolant medium of cooling circuit 5 also serves as the working fluid for retarder 1 in the embodiment presented. The retarder is designed to operate when completely filled with operating fluid. Due to the placement of the retarder downstream of the transmission, the retarder remains permanently linked to the engine during all operating modes, which means that it can also function as a pump to recirculate the coolant medium. During normal operation, i.e., when the retarder is not activated, it serves to circulate the coolant medium within cooling circuit 5. During non-braking operation, valve 6 has a relatively large through-flow area, so that the coolant medium can be pumped through the cooling circuit at minimum flow resistance.

During braking operation, valve 6 has only a small though flow area for the coolant medium to be pumped through the cooling circuit. This makes it possible to build up pressure inside the retarder for the generation of braking torque. Valve 6 can be a continuously variable flow control valve, making it feasible to achieve continuously variable control of the braking torque. It is also feasible to control the braking torque in step-like manner with an appropriately controlled valve.

The continuously variable flow control valve or proportional control valve 6 is controlled by control/regulator unit 12 (preferably a microprocessor) via control line 10. The proportional control valve 6 can be controlled by control/regulator unit 12 via control line 10 in response to the sensor inputs to the control/regulator unit in such a way that desired braking torque can be achieved. For example, by changing the through-flow area of flow control valve 6, the amount of charge into the retarder is reduced and therefore, the braking torque is altered.

In the present embodiment, vehicle acceleration or throttle activation is signaled via a first sensor 14. For that purpose, a signal of the engine torque is recorded; whereby, a signal of $M_{mot}>0$ indicates "accelerating" and $M_{mot}=0$ indicates all other operating modes. If the fuel flow to the engine is increased by moving the throttle lever 16 and the vehicle is accelerated, the fuel sensing line 18 provides an "ON-signal" to the input of controller 12; in all other cases the signal is an "OFF-signal".

In addition to the sensor input indicating that the vehicle is being accelerated, there are other sensor inputs used by control/regulator unit 12 for the control of valve 6. The second sensor input relates to the operating state of the clutch which separates the drivetrain from the transmission. This sensor input is taken at the clutch unit 2 and is transmitted to the control/regulator unit 12 via the clutch state sensing line 20. If the clutch is in the engaged state, clutch state sensing line 20 provides an "OFF-signal" to the input of control/regulator unit 12; in all other cases, it provides an "ON-signal" to the control/regulator unit.

A third sensor input to the control/regulator unit 12 for the control of valve 6 is an engine speed signal, which is received via sensor 24 from a pick-up location on the alternator.

In a further embodiment of this invention, a fourth sensor signal is provided to the control/regulator unit via line 26, which recognizes the gearshift position of transmission 2.

Figure 2:
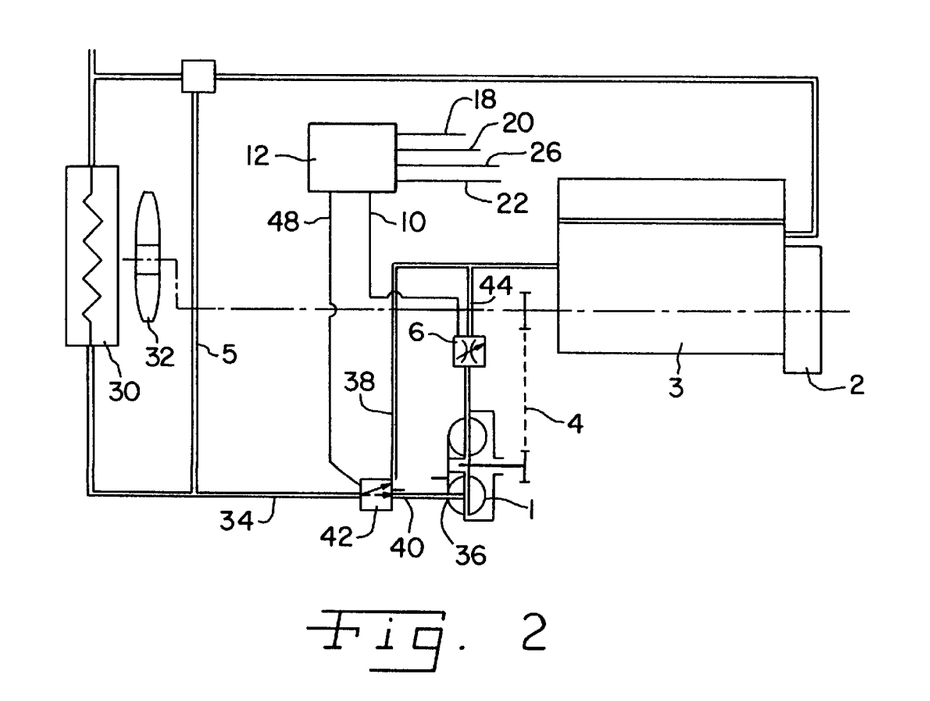
FIG. 2 is a schematic diagram of another embodiment of a primary retarder including a control device in accordance to this invention.

FIG. 2 illustrates a second embodiment of a primary retarder which is representative of a primary system with a control device in accordance to this invention.

The power plant comprising engine 3, transmission 2 and retarder 1 is substantially the same as depicted in FIG. 1, and the same reference numbers are used for the same componentry. Retarder 1 is permanently connected or fixedly attached to the engine 3, more particularly, to the crankshaft of the engine 3. In the presented case, the permanent connection is achieved with a gear reduction unit. Cooling circuit 5 includes a cooler 30 including fan 32. FIG. 2 includes a modification of the embodiment of FIG. 1, namely a different valve arrangement for the setting of the fundamental operating modes of the retarder 1. The line from the cooler outlet to the fluid inlet at the retarder branches at point 40 into supply line 36 to the retarder 1 and by-pass line 38. Point 40 is associated with a by-pass valve 42, preferably a 3/2 directional control valve. Depending on the principal operating mode, the valve 42 is switched so that the coolant medium either bypasses the retarder 1 via the by-pass line 38 or passes through the retarder 1. The by-pass line 38 is open whenever the vehicle is driven in a non-braking mode. FIG. 1 shows valve 6 positioned in line 44 leading from the retarder 1 to engine 3. Valve 6 allows a continuously variable adjustment of the retarder braking torque during the braking mode. This valve 6 is preferably a control valve, which can adjust the degree of filling of the retarder 1 and thus, the braking torque on a continuously variable basis. There are advantages if this control valve 6 is designed as a proportional control valve.

By-pass valve 42, as well as control valve 6, are connected to the output of control/regulator unit 12 via control lines 48 and 10. The input side of control/regulator unit 12 receives a total of 4 sensor input signals via control lines, as shown in the example of FIG. 1. These inputs include the sensor input received on sensing line 18 signaling a fuel delivery state, the sensor input received on sensing line 20, signaling the state of the clutch, the sensor input received on sensing line 22, signaling the rotational speed of the engine 3, and in a more advanced design, sensor input received on sensing line 26, signaling the neutral gearshift position of the transmission 2.

Figure 3:
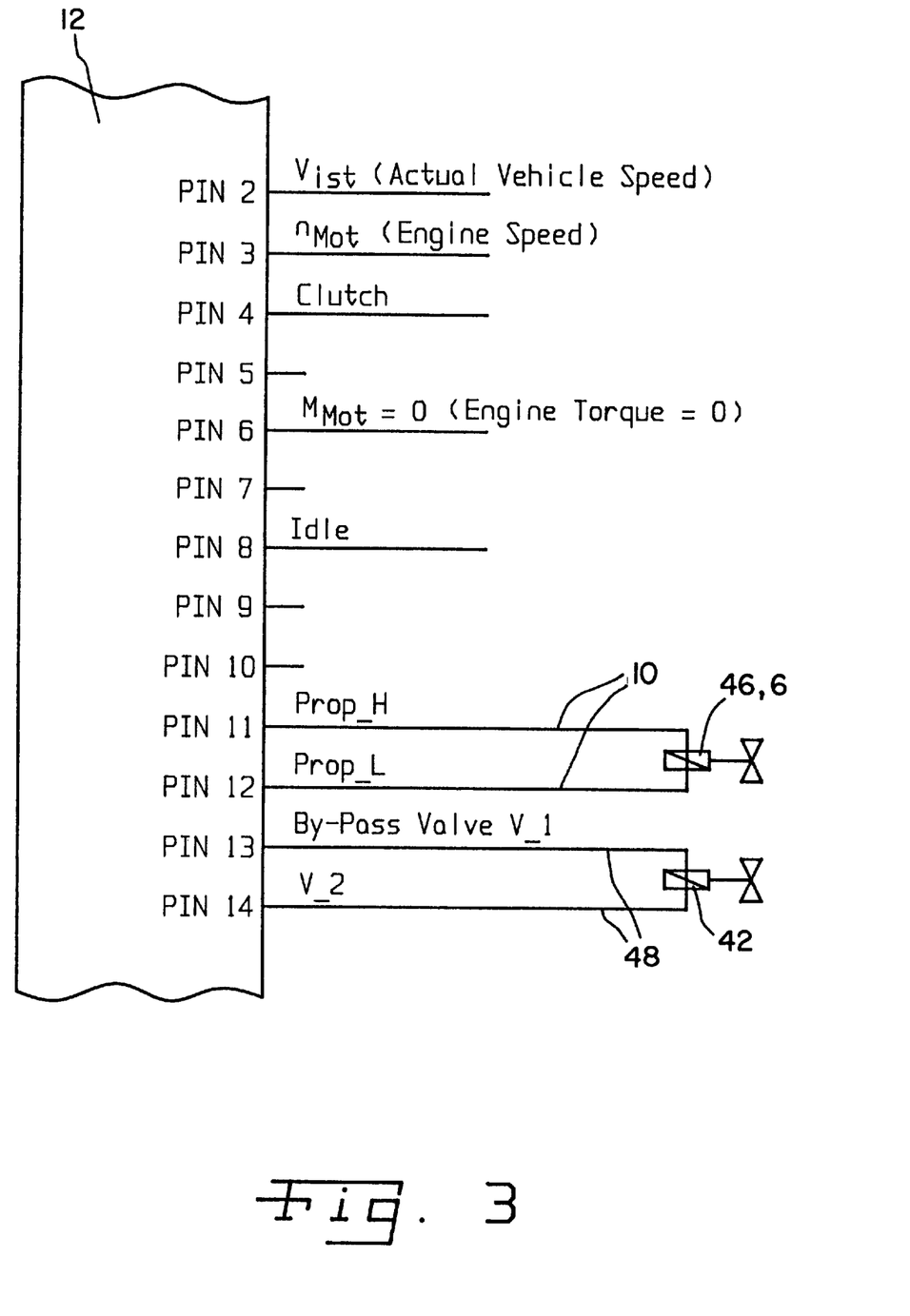
FIG. 3 is a fragmentary, schematic diagram of the control/regulator unit of FIGS. 1 and 2 with the appropriate input configurations.

FIG. 3 shows an example of the individual connections of the control/regulator unit 12 which are of relevance in the present case. As can be seen from FIG. 3, the input of control/regulator unit 12, serving as a microprocessor, is supplied with a load sensor signal, a fuel delivery state (throttle position) sensor signal, a clutch state sensor signal, as well as an engine speed sensor signal.

On the output side, connections PIN 11 and PIN 12 are linked to control valve 6—which in this particular case is a proportional control valve—via line 10; PIN 13 and PIN 14 are linked to by-pass valve 42, in accordance with the optional by-pass arrangement shown in FIG. 2.

The control valve 6, applied as a proportional control valve, is in the present exemplification designed so that it can be set to two states via control line 10—an "ON-state" and an "OFF-state". In the "OFF-state", the proportional control valve 6 is inactive, meaning only minimum braking torque is generated by the retarder 1. In the "ON-state", the proportional control valve is active. In accordance to the selected setting of the braking torque level by use of an operator switch having the capability of being placed in different positions, the desired braking torque can be achieved on a continuously variable basis. With valve 6, as shown here, this can be achieved by adjusting the through-flow port of the valve 6 in accordance to the selected braking level. In the section below, the control valve 6 will be referred to as a proportional control valve.

Figure 4:
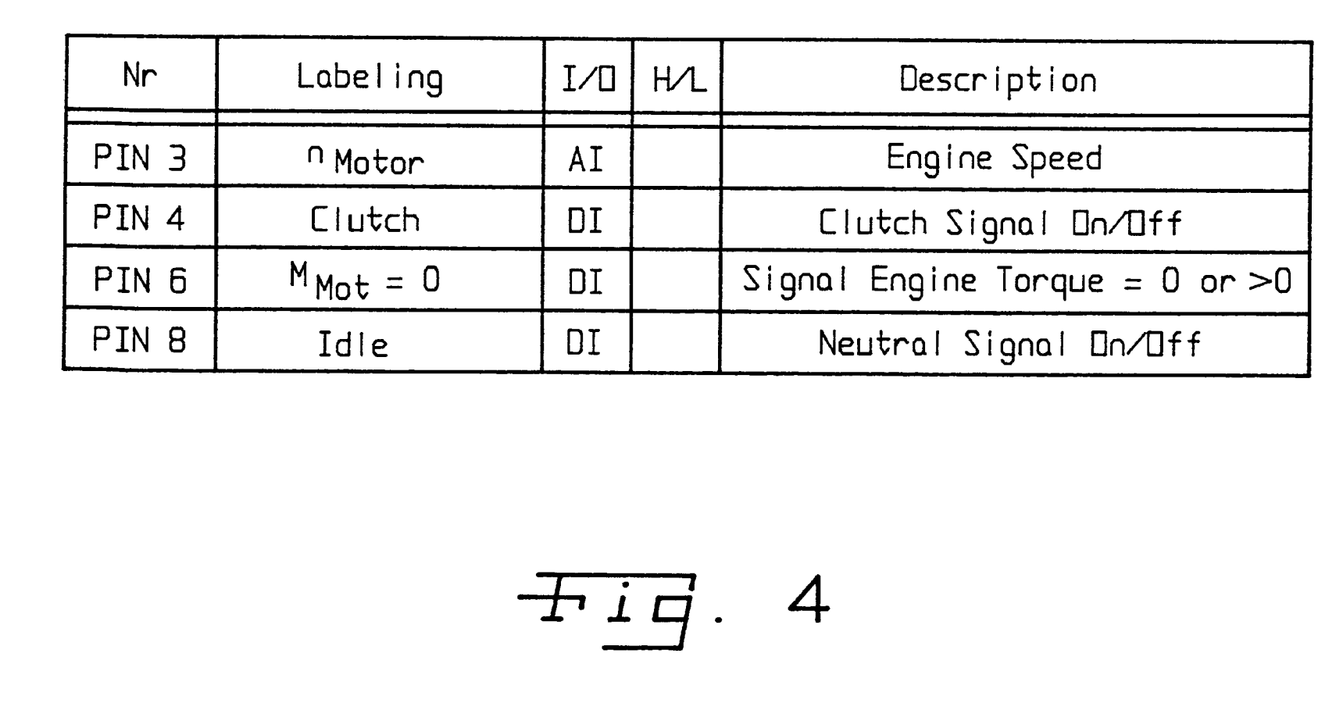
FIG. 4 is a table of the input signals (sensor signals), to the control/regulator unit per FIG. 3.

FIG. 4 depicts an overview of the input signals, which can be retrieved by a CAN-Bus and input to microprocessor 12. PIN 3 is designated for the engine speed and can be, for example, a frequency signal. PIN 4 is designated for the clutch state and is, preferably, a digital signal, describing the clutch state in form of an "ON" or "OFF". The sensor signal "accelerate" or vehicle acceleration can be, as described previously, a signal derived directly from the engine torque. A torque>0 indicates "accelerate" and a torque=0 indicates the remaining operating modes. In an alternative design, it is also feasible to directly sense the throttle pedal position in order to derive an appropriate sensor signal.

The optional neutral gearshift position signal PIN 8 is an indicator of whether the transmission is in neutral.

Figure 5:
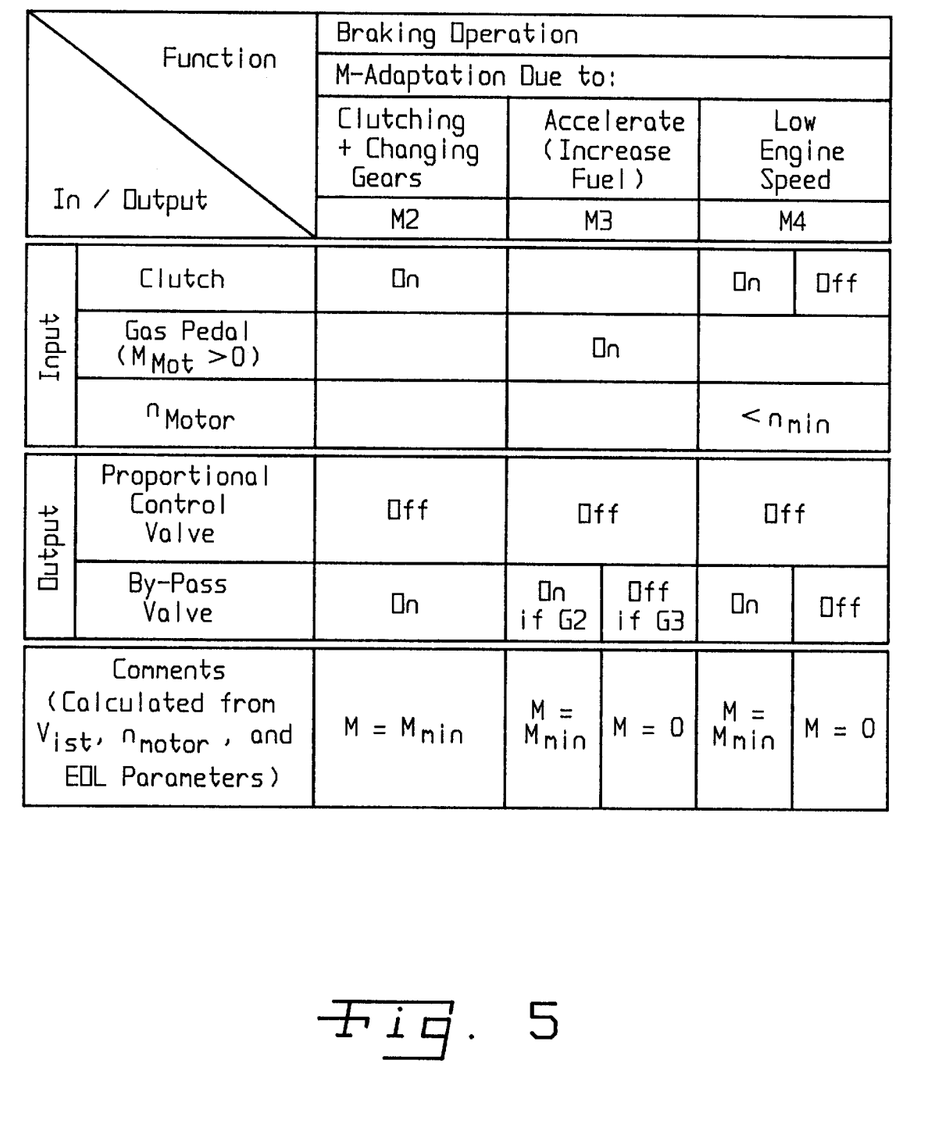
FIG. 5 is a table of the inputs and outputs of the control/regulator unit per FIG. 3 in the respective operating situations during braking operation.

The control element, which is simply a proportional control valve 6 per the arrangement shown in FIG. 1, or a proportional control valve 6 including an additional by-pass valve 42 for activation of the bypass line 38 as shown in FIG. 2, is controlled in certain operating modes by the control/regulator unit 12 in response to the input sensor signals of which there are three listed in the first three columns of the table in FIG. 5.

The matrix of FIG. 5 exemplifies the input and outputs of the control/regulator unit's microprocessor for various operating modes. In the subsequent description, an "ON-state" is represented by a logical ONE and an "OFF-state" is represented by a logical ZERO.

Column M2 depicts the adaptation logic of the braking torque with respect to the clutch state. This adaptation occurs when the clutch pedal is depressed, which means the driving rotating components are separated from the driven rotating components. In this case, the output to the proportional control valve 6 signals a logical ZERO, so that the proportional control valve is in the OFF-state, which means that no braking torque is generated by the retarder 1. If an additional by-pass valve 42 is to be controlled, an ON clutch signal also activates this by-pass valve 42 to the ON-position (logical ONE), which means the by-pass is not being opened and the total braking torque of the retarder 1 remains at the minimum level.

The case presented in column 3, torque adaptation is achieved when the internal combustion engine 3 is supplied with fuel; that is, the throttle lever 16 is moved to increase the amount of fuel provided to the engine 3. In this case, the engine 3 should not be operating against a retarder load. The "accelerate" signal is provided in form of engine torque, which in this case is>0. If this is the case, the sensor signal responsible for the state of the throttle is set to ON. If such a signal is attached to the input of microprocessor 12, the output signal of the microprocessor to the proportional control valve 6 is set to an OFF state. In a design variation shown in FIG. 1, which includes only one proportional control valve 6 as control element, minimum retarder braking torque is achieved when the proportional control valve 6 is deactivated, or in the OFF position. In a design according to FIG. 2, which includes an additional by-pass valve 42, there are two control possibilities to achieve torque adaptation during acceleration. In principal operating mode G2, which relates to a fixed braking mode, the by-pass valve 42 is in the ON-position, which means that the by-pass loop is shut off. In this operating mode, the retarder 1 is operated at minimum retarder braking torque $M_{min}$. Alternatively, in the principal operating mode G3, which relates to a constant speed operating mode, the by-pass valve 42 is in the OFF position, which means that the by-pass valve 42 opens the by-pass loop. The braking torque applied to the engine 3 is near zero.

The third operating mode (M4), which requires torque adaptation during the braking mode, occurs when the engine 3 falls below a certain rotational speed threshold $n_{min}$. This can be the case with the clutch engaged or disengaged. If the engine speed falls below a certain minimum speed, the control/regulator unit 12 signals a logical ZERO to the proportional control valve 6, which means that the proportional control valve 6 is set or held in the OFF position. If there is a by-pass valve 42 in addition to the proportional control valve 6, then it is feasible to realize these two operating modes: one mode with the by-pass deactivated, which has the consequence that the retarder torque corresponds to the minimum retarder torque; the other mode is realized with the by-pass activated, allowing the braking torque to drop to nearly zero.

Figure 6:
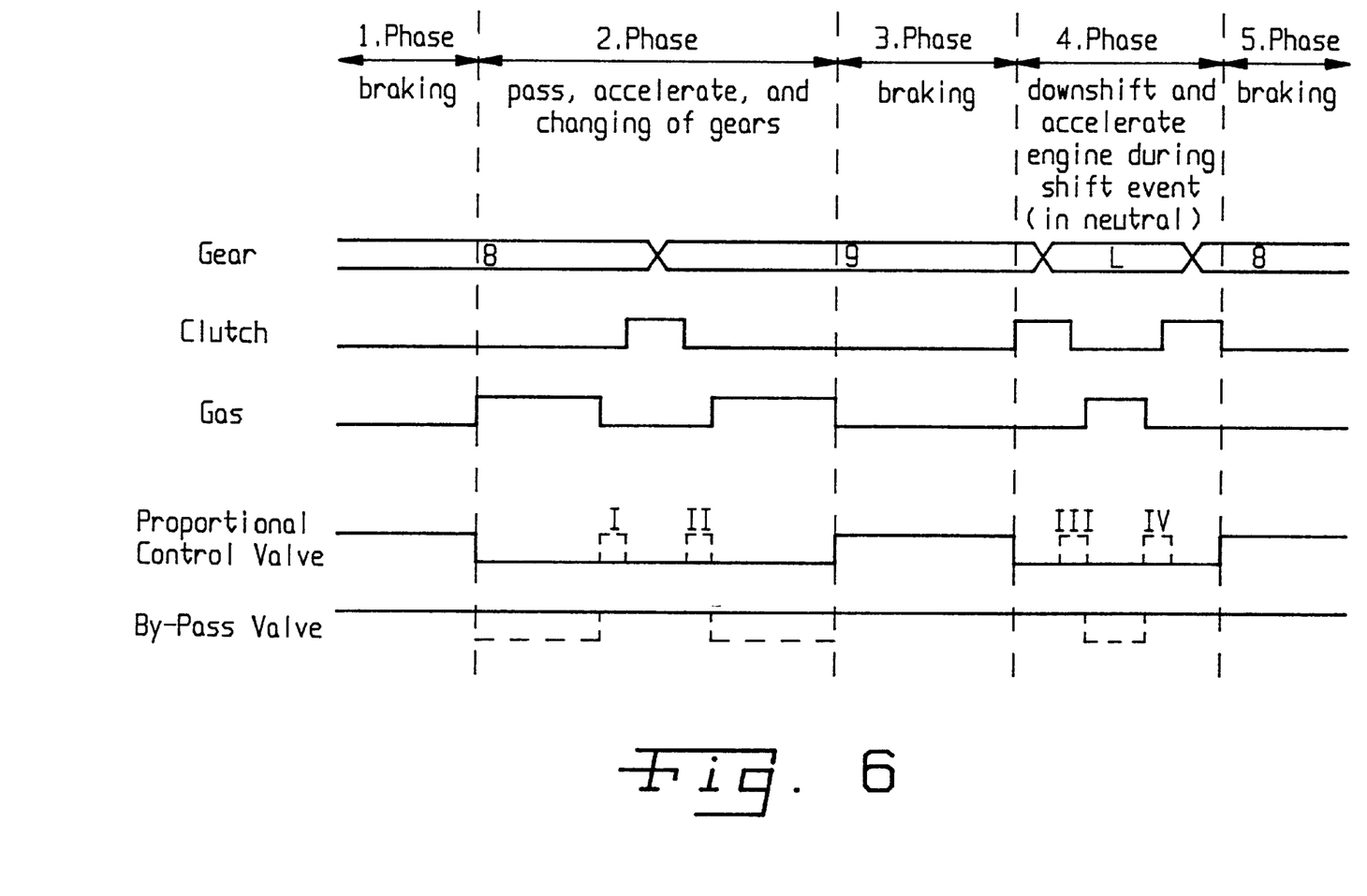
FIG. 6 is a plot of a simulated operating cycle over time with the input and output signals to the control/regulator unit, in accordance to this invention.

FIG. 6 shows in form of an example the input signals for clutching and accelerating, as well as the output signals for the proportional control valve 6 and the by-pass valve 42. These signals are all associated with the input/output circuitry of the control/regulator unit 12, serving the function as a microprocessor and are depicted in relation to various operating modes as a function of time. The logic convention in FIG. 6 is the same as indicated previously; an ON-position of the valve equals a logical ONE, an OFF position of the valve equals a logical ZERO. This convention was selected in order to present a clearer description of the logic diagram shown in FIG. 6. It is to be understood that the ON and OFF positions can also be provided with other signals. FIG. 6 illustrates various possible operating modes which can be encountered during downhill operation while the retarder is in operation. Also shown are the principal operating modes of a fixed braking mode (G2) as well as a constant speed mode (G3).

In the first phase of the operating simulation, the vehicle is moving in eighth gear. The vehicle is in the operational mode "braking" by the retarder 1. During this mode of operation, the driving rotating components are connected to the driven rotating components. The resulting signal for the clutch state is ZERO. Since no acceleration takes place during braking, the sensor signal for the throttle position—in the presented case, a throttle pedal—is also assigned a logical zero.

The output signal to the proportional control valve 6 is assigned a logical ONE, which means that the proportional control valve 6 is activated or in the ON state. For a fixed pre-set breaking level, a certain proportional voltage signal—a signal proportional to the braking level (G2)—is provided. For the case which calls for a constant speed (G3), microprocessor 12 controls the proportional voltage signal of the proportional control valve 6 so that $V_{actual}=V_{target}$. The signal for the by-pass valve is assigned a logical ONE, which means that the by-pass valve 42 is not activated.

If the vehicle is accelerated after the braking phase and the vehicle is shifted into a different gear, then the input and output signals of FIG. 6-phase 2 apply.

As long as a gear is engaged, the signal for the clutch state is assigned a logical ZERO. In the event the clutch is activated, the signal assigned to the clutch state changes to a logical ONE. During the time period in which the clutch state signal remains a logical ONE, the proportional control valve 6 is deactivated (logical ZERO), as evidenced in the input-output matrix vs. operating modes, column M2 of FIG. 5.

If, during the acceleration process and prior to any shift events, the throttle pedal is activated (ref. FIG. 6), then the throttle position signal to the microprocessor 12 is assigned a logical ONE, which, in accordance to the matrix of FIG. 5, operating mode M3, assigns a logical ZERO to proportional control valve 6; this translates to a braking torque reduction during this time period.

The signal of the by-pass valve 42 for the braking mode is always at a logical ONE, which means that the by-pass loop is closed off, as evidenced by the straight line depicting the operational state of this valve. This, however, is only valid for the principal operating mode (G2) indicating a fixed braking level. If the vehicle operates in principal operating mode (G3); that is, the vehicle is moving at constant speed, the by-pass valve 42 is set to a logical ZERO while the throttle pedal is activated, which in turn, opens the by-pass loop.

As can be gleaned from the time-history graph for the proportional control valve, the valve is assigned a logical ONE and, therefore, is activated for the duration of time in which the throttle pedal is not activated and the clutch pedal is not yet activated. This condition is shown in dashed line in the second phase of the time-history graph and labeled with the Roman Numerals I and II. A retarder braking torque is, at this stage, undesirable. In order to reduce the braking torque during the entire shift event, that is, the time period between shutting off the fuel supply to the engine 3 prior to the clutch event, and the subsequent increase in fuel supply to the engine 3 after the clutch event, the invention provides a time-delay element or "ramp", which assures that no rapid retarder activations can occur. An activation of the retarder 1 occurs phase shifted with respect to the sensor signal. If the retarder 1 is activated in response to, for example, a change in the throttle signal from a logical ONE to a logical ZERO in a delayed fashion, then the activation of the proportional control can be—for a situation exemplified by the second phase—avoided for a duration of time labeled by Roman Numeral "I".

It is equally feasible to activate the retarder 1 in response to a change in the clutch signal from a logical ONE to a logical ZERO in a delayed fashion. This way, the undesirable signal with the duration of time labeled by the Roman Numeral "II" in the second phase can be avoided. Because of these time-delay elements, it is possible—as described by this invention—to maintain the retarder braking torque at the minimum level during gearshift events or to assure a reduction in the braking torque.

The third phase of the presented driving cycle once again simulates a braking scenario. Since the throttle is in a non-activated state during braking, the throttle sensor signal changes from a logical ONE to a logical ZERO. In accordance to the assignments of the input and output functions, this has the consequence that during the braking mode the proportional control valve 6 changes from the OFF to the ON state and, henceforth, provides the desired braking action. For the principal operating mode G3 which provides for a constant vehicle speed, this change to the input to the control device 12 provokes a change to the output, causing the by-pass valve 42 to switch from the "by-pass" mode to the "retarder" mode.

Adjacent to the third phase, which simulates a braking scenario, is a fourth phase which simulates a driving scenario in which the vehicle is shifted from a higher to a lower gear. When shifting to the lower gear, the clutch event is supported by a brief engine speed excursion (double clutch concept).

This means that, at first, the clutch pedal is depressed. This causes the clutch state input signal to the control device 12 to switch from a logical ZERO to a logical ONE, which, according to the table of FIG. 5, leads to torque adaptation per case M2. This has the consequence that the output signal to the proportional control valve 6 is assigned a logical ZERO, resulting in the proportional control valve 6 to be switched to the OFF position and causing the retarder 1 to provide only the minimum of braking torque. After the first clutch event, the engine is accelerated, followed by a second clutch event while the transmission is in neutral. Due to the second clutch event, the clutch state signal to the input of the microprocessor 12 changes from a logical ONE to a logical ZERO. This has the consequence that the torque reduction is no longer effective and the output signal to the proportional valve 6 is set to a logical ONE, causing it to be activated and, therefore, creating an undesirable braking torque.

This undesirable braking torque (shown by the dash-point-dash line and labeled with the Roman Numeral III) for the proportional control valve 6 continues to build until fuel is applied to the engine. As a result of the engine acceleration, torque adaptation (ref. FIG. 5) is activated, meaning the throttle state input signal, having been set to a logical ONE, leads to the output to the proportional control valve 6 to be set to a logical ZERO and, therefore, to the generation of minimum retarder torque when the vehicle is operated at a fixed braking level (G2) or, to the generation of a near zero retarder torque, when the principal operating mode v=constant (G3) is chosen. This undesirable build-up of braking torque for the time period between clutching and the renewed engine speed increase, can be avoided in different ways. One solution includes—as mentioned above in the description of the second phase—a time-delay tactic in form of a ramp for the activation of the retarder 1.

Alternatively, it is feasible—if a neutral gearshift position can be recognized and submitted to the microprocessor 12 in form of an input signal—to appropriately control the proportional control valve 6 by setting the output to the proportional control valve 6 to a logical ZERO during the entire period of time in which the neutral gearshift position signal is present at the input to the microprocessor 12. This has the consequence of de-activating the proportional control valve 6 and, hence, reducing the braking torque to the minimum braking torque level. In case the by-pass valve 42 is not deactivated, meaning the retarder 1 is being circulated by the cooling medium, then the minimum braking torque is achievable. In case the by-pass valve 42 is deactivated, and the cooling medium bypasses the retarder 1, it is feasible to achieve the lowest possible braking torque. In addition to the neutral gearshift position recognition tactic, a device can be provided to recognize what gear the vehicle uses at any given point in time.

In case a neutral gearshift position recognition is not feasible, then a fall-off in engine speed below a pre-defined minimum engine speed threshold can be used as an input signal—independently from the clutch state (ref. FIG. 5, columns M)—to set the output signal to the proportional control valve 6 to a logical ZERO. This achieves an immediate reduction in braking torque, avoiding the retarder 1 being operational while the transmission 2 is in neutral.

As can be seen in the fourth phase of the time-history diagram, the period in time after the engine 3 has peaked in speed and after a renewed clutch event, undesirable braking torque once again develops if none of the measures described above have been implemented. The braking torque is, as described above, the result of the proportional control valve 6 being activated via a control signal which is set to ONE. This undesirable condition is shown in the time-history diagram for the proportional control valve 6 with a dash-point-dash line and labeled by the Roman Numeral IV. Just like the undesirable signal III, the build-up of a braking torque in this case can be avoided by implementing a time-delay during the activation of the retarder 1 in response to the throttle state signal changing from a logical ONE to logical ZERO. Alternatively, a neutral gearshift position recognition algorithm or a regulation due to the engine speed being too low could be applied here.

Adjacent to the fourth phase of the simulated driving cycle is the fifth phase, which reflects a braking operation in one of the principal braking modes—fixed braking level or a V-constant. As can be seen from the time-history diagram for the output signal to the proportional control valve 6, there is braking torque present, as would be expected.

With the present invention, it is for the first time feasible to achieve torque adaptation to a minimum braking torque level during the entire gearshift event so that, during this entire period of time, the retarder 1 is not acting against the engine with the commanded braking torque.

Even though the above description is primarily in reference to a primary braking system such as a retarder 1, in particular a hydrodynamic retarder, this invention is not limited to solely these types of devices. The term retarder can also include retarders which are based on the Eddy current concept (Ref.: Last Auto Omnibus Apr. 1, 1991 aaO). Furthermore, the control of all popular state-of-the-art engine brake systems, whether modulatable or not, can be achieved with the present invention.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A control apparatus for a drivetrain of a motor vehicle, comprising:

a primary retarder having a braking torque being one of increased and reduced;

at least one sensor configured for sensing at least one shifting event with a time duration and transmitting at least one sensor signal indicative thereof;

a recognition device configured for receiving said at least one sensor signal and recognizing said at least one shifting event therefrom;

at least one actuator configured for controlling the braking torque of said primary retarder; and     at least one control/regulator unit electrically connected to each of said recognition device and said at least one actuator, said at least one control/regulator unit being configured for controlling said at least one actuator in response to said at least one sensor signal such that the braking torque of said primary retarder is reduced substantially throughout said time duration of said at least one shift event;

wherein said at least one control/regulator unit is configured for controlling said at least one actuator in response to a fuel delivery state signal and at least one clutch state signal such that the braking torque of the primary retarder is reduced substantially throughout a time duration of fuel delivery and a clutch disengagement; and said recognition device is configured for recognizing at least one of:
gearshift positions including a neural position;
a state of a clutch;
a fuel delivery state; and
an engine speed.

2. The control apparatus of claim 1, wherein said at least one control/regulator unit is configured for controlling said at least one actuator in response to a rotational engine speed signal such that the braking torque of the primary retarder is reduced when a rotational speed of an engine falls below a predetermined minimum engine speed.

3. The control apparatus of claim 2, wherein said at least one control/regulator unit is configured for controlling said at least one actuator in response to a neutral gearshift position signal such that the braking torque of the primary retarder is reduced to a predetermined level substantially throughout a time duration in which a transmission is in said neutral gearshift position.

4. The control apparatus of claim 3, wherein said at least one actuator includes a control valve.

5. The control apparatus of claim 4, wherein said at least one actuator further includes a by-pass valve.

6. The control apparatus of claim 4, wherein the primary retarder is included in a primary brake system.

7. A method of controlling a primary retarder in a drivetrain of a motor vehicle, comprising the steps of:

transmitting a plurality of sensor signals indicating at least one of a transmission gearshift position, a clutch state, a fuel delivery state, an engine speed, and a neutral gearshift position;

receiving said sensor signals;

in response to said receiving step:
recognizing a shift event in the vehicle;
activating at lest one actuator for controlling a braking torque of the primary retarder; and
controlling said at least one actuator with at least one control/regulator unit such that the braking torque of the primary retarder is reduced substantially throughout a time duration of said shift event; and in response to a change in said sensor signals, changing the braking torque of the primary retarder from a reduced braking value to a predetermined braking value, said changing step being time-delayed relative to the change in said sensor signals.

8. The method of claim 7, wherein said primary retarder is included in a primary braking system.

* * * * *